US009020953B1

(12) United States Patent
Zilmer et al.

(10) Patent No.: US 9,020,953 B1
(45) Date of Patent: Apr. 28, 2015

(54) SEARCH TABLE FOR DATA NETWORKING MATCHING

(75) Inventors: Morten Zilmer, Oelstykke (DK); Craig Robert Schelp, Surrey (CA)

(73) Assignee: PMC-Sierra US, Inc., Sunnyvale, CA (US)

( * ) Notice: Subject to any disclaimer, the term of this patent is extended or adjusted under 35 U.S.C. 154(b) by 296 days.

(21) Appl. No.: 13/414,383

(22) Filed: Mar. 7, 2012

Related U.S. Application Data

(60) Provisional application No. 61/450,377, filed on Mar. 8, 2011.

(51) Int. Cl.
*G06F 17/30* (2006.01)
(52) U.S. Cl.
CPC ................................ *G06F 17/30955* (2013.01)
(58) Field of Classification Search
CPC ..................... G06F 17/30952; G06F 17/30955
USPC .......................................................... 707/747
See application file for complete search history.

(56) References Cited

U.S. PATENT DOCUMENTS

| 7,657,500 B2 | 2/2010 | Shavit et al. | |
|---|---|---|---|
| 7,752,418 B2 | 7/2010 | Ross | |
| 2002/0032676 A1* | 3/2002 | Reiner et al. | 707/3 |
| 2005/0187898 A1* | 8/2005 | Chazelle et al. | 707/1 |
| 2008/0228691 A1* | 9/2008 | Shavit et al. | 707/1 |
| 2010/0011028 A1* | 1/2010 | Dade | 707/200 |
| 2010/0036820 A1* | 2/2010 | Stergiou et al. | 707/3 |

* cited by examiner

*Primary Examiner* — Robert Beausoliel, Jr.
*Assistant Examiner* — Nirav K Khakhar
(74) *Attorney, Agent, or Firm* — Dennis R. Haszko

(57) ABSTRACT

A high efficiency search table is implemented with a multiple hash algorithm. The search table allows for exact match searching of arbitrary data sets with fixed latency. The probability of collisions from the hash algorithms is reduced through the use of oversized pointer tables allowing for a level of indirection between hash values and table entries. In the event of a collision in all hash functions, a firmware assisted cuckoo algorithm is employed to resolve the collision.

19 Claims, 5 Drawing Sheets

SEARCH TABLE FOR DATA NETWORKING MATCHING

CROSS REFERENCE TO RELATED APPLICATIONS

This application claims the benefit of priority of U.S. Provisional Patent Application No. 61/450,377 filed Mar. 8, 2011, which is incorporated herein by reference in its entirety.

FIELD

The present disclosure relates to data networking applications, including but not limited to high performance search tables for exact matching in networking applications.

BACKGROUND

Exact match search tables are frequently used in data networking to resolve destination ports or forwarding addresses. Common search keys are destination Ethernet Media Access Control (MAC) addresses for Ethernet switching, destination Internet Protocol (IP) addresses for Address Resolution Protocol (ARP) table resolution, or Multiprotocol Label Switching (MPLS) labels for label switch routing. High bandwidth devices used in these applications require search tables with high search rates and deterministic low latency.

Existing hash based search tables suffer from reduced efficiencies in the hash algorithms where the probability of collision becomes unacceptably high as the table becomes full. Radix or Patricia tree based implementations, which are also common in networking devices, have unpredictable latency that grows with table size leading to uncertainty in the achievable throughput.

Probability of Hash Collision

A typical well balanced hash function can be measured in terms of the probability that a new entry will collide with an entry already in the table. FIG. 1 is a graph 10 illustrating the probability Q(n) of collision of item n with existing entries in a simple hash. The probability of collision for a new entry is shown in FIG. 1 for a table of size 32768 at different fill levels. As can be seen in the graph 10, the probability of collision will exceed 60% as the table becomes full. This probability distribution also assumes that any collision seen in previous additions to the table have been resolved. This is fine for software applications which typically run at a low percentage fill, sometimes as low as 2%, but for a chip for networking, this is unacceptable.

In applications where removal of an existing entry in the case of collision is not permitted, such as in MPLS label switch routing tables, all collisions must be resolved. If a typical approach of building a linked list of entries at the colliding value of the hash value is employed, the latency of the search will no longer be deterministic, since it cannot be completed in a single look-up cycle, which refers to one reading of the table. Therefore, in such a case the packet processing rate will not be able to be guaranteed. Using this case of no unresolved collisions and where only a single value may be stored per hash result, a much worse probability of collision results.

The probability of collision can be modeled in the same way as the birthday problem in probability theory, and is shown in FIG. 2. A graph 20 in FIG. 2 illustrates the probability P(n) of collision for a 1-way hash with 32768 buckets. As can be seen in the graph 20, the probability of a collision in the dataset exceeds 90% at fewer than 400 entries in a 32768 entry hash table. Clearly, a simple 1-way hash function is unacceptable for arbitrary datasets where no collisions are permitted.

Moving to a multiple way hash function where multiple hash functions are executed in parallel helps solve this problem. A common implementation is a cuckoo hash where n parallel hash functions are employed. Upon collision in one hash function, the entry is added using the other hash function. If all hash functions have a collision, then one of the existing entries is removed to make space for the new entry and the removed entry is then reinserted using the multiple hash functions.

FIG. 3 is a graph 30 illustrating the probability of collision for the nth entry in a 2-way hash when the fill levels of both hash tables are similar, assuming independent hash functions. By extending this to many hash functions, the probability of collision can be reduced to a low value. However, each hash function increases the size of implementation and increases the number of memory accesses that must be performed in searching of the hash tables. Further, the latency of performing insertions with a cuckoo algorithm must be hidden so as not to impair the add rate of the overall hash table, as it is generally unknown how many times to iterate the cuckoo algorithm before an insertion (add) does not generate an overflow (collision on all hash algorithms).

High performance search tables enabling collision-less exact matching of large sets of data are required for packet networking applications such as MPLS label switch routing, IP address resolution tables for MAC destination addresses, or for better performance in Ethernet bridging. Hash based solutions provide low latency and high throughput. However, existing hash solutions suffer from collisions that are data set dependent and do not permit their use for MPLS Label Switch Router (LSR) applications.

Improvements in search tables and related hash functions are desirable.

BRIEF DESCRIPTION OF THE DRAWINGS

Embodiments of the present disclosure will now be described, by way of example only, with reference to the attached Figures.

FIG. 3 is a graph illustrating the probability of collision for the nth entry in a 2-way hash when the fill levels of both hash tables are similar.

DETAILED DESCRIPTION

Figure 1:
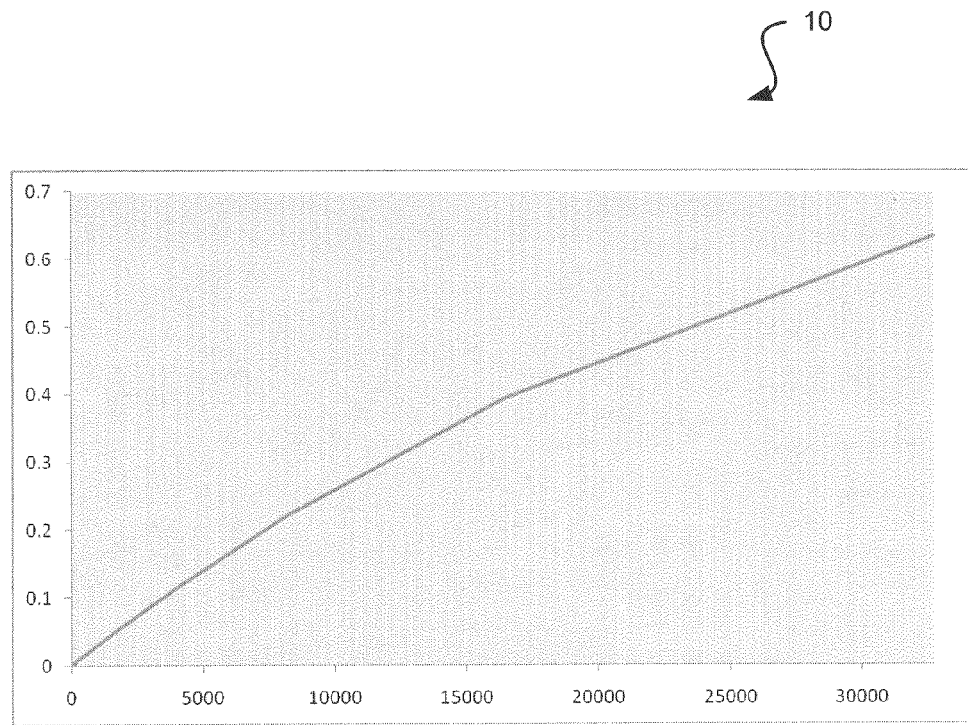
FIG. 1 is a graph illustrating the probability Q(n) of collision of item n with existing entries in a simple hash.
Figure 2:
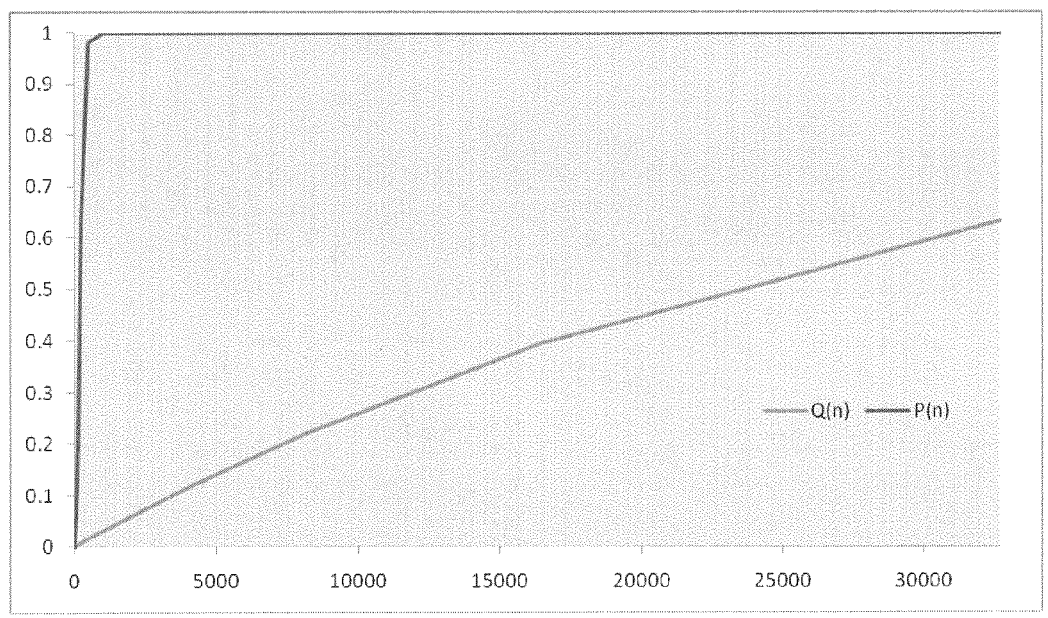
FIG. 2 is a graph illustrating the probability of collision for a 1-way hash with 32768 buckets.

A high efficiency search table is implemented with a multiple hash algorithm. The search table allows for exact match searching of arbitrary data sets with fixed latency. In an implementation, the probability of collisions from the hash algorithms is reduced through the use of oversized pointer tables allowing for a level of indirection between hash values and table entries. In the event of a collision in all hash functions, a firmware assisted cuckoo algorithm can be employed to resolve the collision. The present disclosure provides a hash solution that has very low probability of collision with an offline, non-real-time cuckoo mechanism that allows for collision-less operation.

In the following description, the acronym ASL is used to refer to Address Search and Learn functionality associated with embodiments of the present disclosure.

In an embodiment, the present disclosure provides a networking device comprising a search table, the search table including a plurality of hash functions, a plurality of value tables associated with the plurality of hash functions, and a plurality of indirect tables associated with the plurality of value tables. The plurality of indirect tables increase a hash space relative to total number of entries in the plurality of value tables.

In an example embodiment, each of the plurality of indirect tables is associated with a corresponding value table. Each of the plurality of indirect tables can include pointers, the pointers pointing to full entries of keys and values in corresponding value tables. In an example embodiment, the size of a selected indirect table from the plurality of indirect tables can be larger than the size of the corresponding value table.

In an example embodiment, the networking device further includes a free entry list configured to identify available entries in a value table that are mapped to an entry in an indirect table. In an embodiment, the indirect table entry to value mapping is stored in the indirect table. In an example embodiment, a separate free entry list is provided for each corresponding indirect table and value table pair in the plurality of indirect tables and the plurality of value tables. In an embodiment, a single free entry list is provided for the plurality of indirect tables and the plurality of value tables. In an example embodiment, the free entry list comprises a long bit vector in which each bit represents a location in one of the plurality of value tables.

In an example embodiment, the free entry list comprises more than one level of indexing, and each bit within the index indicates if a space is available within a block of locations in one of the plurality of value tables. In an example embodiment, a different bit vector is used for each of a plurality of blocks of locations, and wherein each bit vector is a different dataword within a random access memory (RAM) instance. In an example embodiment, the free entry list comprises a first-in-first-out (FIFO) based free entry list.

In an example embodiment, the plurality of value tables include a higher level value table and a lower level value table, and the lower level value table has a smaller table size than the higher level value table. In an embodiment, the plurality of value tables comprise an initial value table and a plurality of subsequent value tables, each of the subsequent value tables having a decreasing table size when compared to the preceding value table. In an embodiment, a selected subsequent value table contains the overflow of the preceding table, and the size of the selected subsequent value table is about 60% of size of the preceding table.

In another embodiment, the present disclosure provides a data networking system comprising a plurality of parallel hash engines, a plurality of value tables associated with the plurality of hash engines, and a plurality of indirect tables associated with the plurality of value tables. The plurality of indirect tables increase a hash space relative to total number of entries in the plurality of value tables. The data networking system further includes a non-transitory machine readable medium having stored thereon statements and instructions for execution by a processor to perform cuckoo operations for collision handling, the processor being in communication with the plurality of value tables and the plurality of indirect tables. The non-transitory machine readable medium is in communication with the plurality of value tables and the plurality of indirect tables.

In an example embodiment, the non-transitory machine readable medium comprises firmware configured to perform the cuckoo operations. In an embodiment, the data networking system further comprises a search table comprising a processing unit interface, and the processor comprises a general purpose processor. In this embodiment, the search table further includes the plurality of hash engines, the plurality of value tables, and the plurality of indirect tables, and the general purpose processor includes the firmware and is in communication with the plurality of value tables and the plurality of indirect tables via the processing unit interface of the search table. In an embodiment, collision detection by the firmware for initiation of the cuckoo operations is performed by the key being sent into a collision queue. In an embodiment, the collision queue enables offline processing of collisions for reinsertion such that multiple collisions are queued while reinsertion is pending. In an embodiment, while a nominal collision rate provides for sufficient processing time, the collision queue ensures that collisions clustering in time will not be ignored.

In an example embodiment, priority encoding is implemented in hardware to determine which of the plurality of value tables or indirect tables to use for a given insertion.

The following publications, incorporated by reference in their entirety, can provide useful background information: U.S. Pat. No. 7,657,500 Concurrent extensible cuckoo hashing; U.S. Pat. No. 7,752,418 Splash tables: an efficient hash scheme for processors.

The present disclosure improves upon the existing available hash techniques and implementations by significantly reducing the probability of collision at reasonable cost. Embodiments of the present disclosure provide for a mechanism of resolving remaining collisions in a manner that does not affect the add or search rate of the search table, when compared with the adding of more hash functions, or with increasing the number of entries in the value table to allow for less than a full table. Linked list resolution of collisions affects the search rate, and cuckoo affects the add rate. Embodiments of the present disclosure provide for a deterministic search rate with controlled add rate performance.

Rather than add an increasing number of hash functions to reduce the probability of collision, a lower cost oversized indirect table is employed to increase the number of buckets available to a hash function. The pointers contained in the indirect table in turn point to full entries of keys and values in a value table. The indirect table needs only contain sufficient bits to store addresses for the value table and is therefore low in cost when compared with the adding of more hash functions. In an embodiment, by optimizing for implementation area between increased numbers of hash functions and use of oversized indirect tables, a desired probability of collision can be achieved. By sufficiently reducing the probability of collision, a slow background task can be employed for resolution of collisions using a method performing steps of a cuckoo type algorithm. The present disclosure sufficiently reduces the frequency of collision to enable firmware to be used in resolving of hash collisions. A FIFO or queue is used to allow further processing time by firmware in the case of collisions clustering in time.

Efficient Search Table

Figure 4:
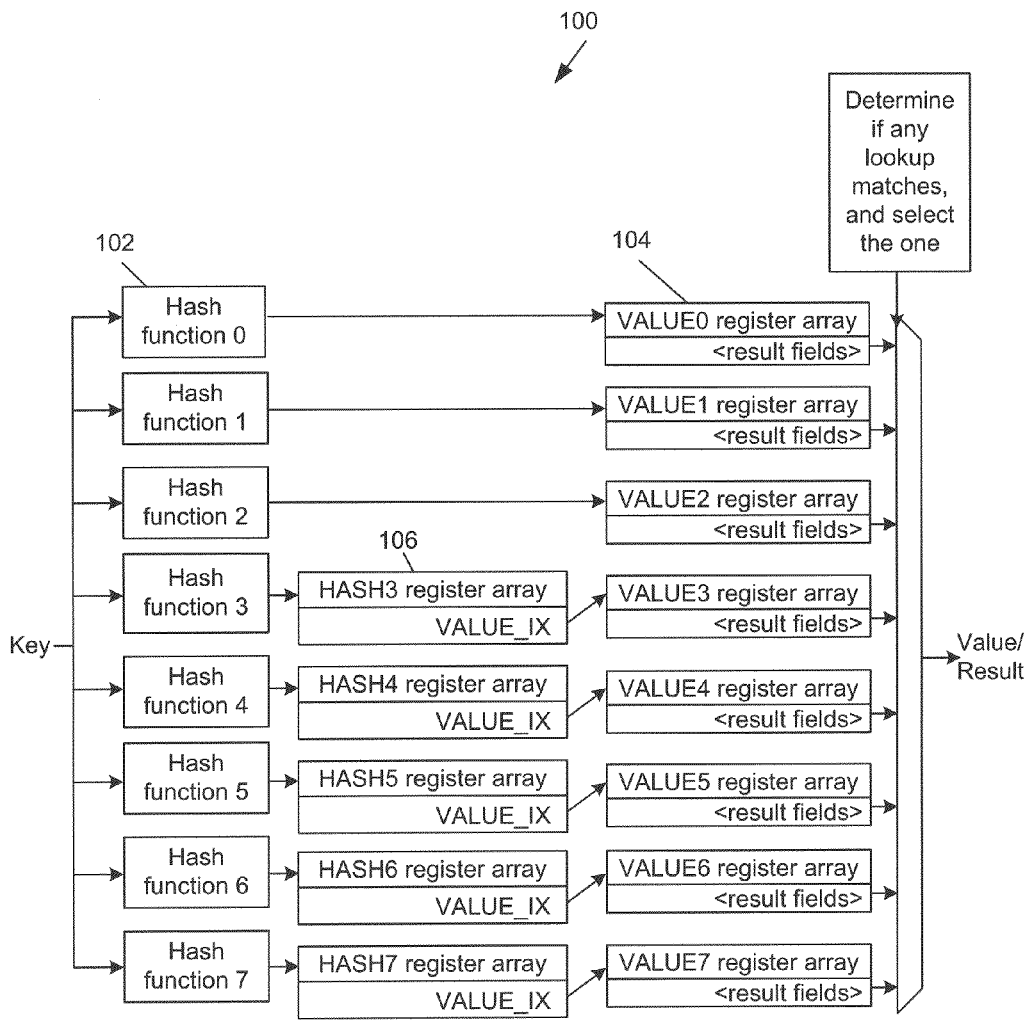
FIG. 4 is a functional block diagram of a hash table system according to an embodiment of the present disclosure.

An overview of a hash table system 100 of an embodiment of the present disclosure, which can be used in an efficient search table, is shown in FIG. 4. A search key is used for lookup using an eight-way hash table. These eight "ways" are illustrated in FIG. 4 as hash functions 102, labelled as hash functions 0, 1, ..., 7. An example implementation of the hash table system 100 according to an embodiment of the present disclosure allows for fitting of up to 32 K (32768) result entries with less than $10^{-6}$ risk of collision or overrun.

In an embodiment, one or more of the hash tables have a larger number of locations in an indirect table than are available in the value table, which reduces the risk of collision.

The first three hash functions 102 in FIG. 4 index directly to the corresponding result table or value table 104, since the typical filling levels of these value tables 104 (VALUE0, VALUE1 and VALUE2) is approximately 100%, as all collisions will be resolved into further tables. In value tables 104 that are expected to be substantially filled, there is typically no savings to be achieved by going through an indirection in a hash table.

The last five hash functions 102 in FIG. 4 index to the indirect tables 106 (HASH<3 ... 7>), which contain pointers to the corresponding value tables 104 (VALUE<3 ... 7>). This can also be referred to as the indirect tables 106 having an index to the corresponding value tables 104. The indirect pointers typically add a small number of bits to the system, since the number of entries in the indirect HASH<3 ... 7> tables 106 can be less than 8 K, due to low typical fill rates. Even with the added indirect pointer bits, overall bit savings are achieved in the hash table system 100; the large number of locations is maintained for mapping by the hash functions 102, which gives the low risk of overrun. This embodiment enables complete filling of the value tables 104 at much lower probabilities of collision. Overall, this structure will enable all locations in the value tables to be filled.

In an embodiment, the hash function produces a pointer to a free location in an indirect table; the pointer in the indirect table points to a free value in the corresponding value table with which the indirect table is associated.

In an implementation, an indirect table is much larger than the associated value table. For example, for a 32 k value table, a 15 bit hash value is used; in that case, the indirect table is 64 k, and the hash is 16 bits, though each entry only needs 15 bits. With a 32 k value Table, the search key is likely several hundred bits, and may be over 1000 bits wide. The corresponding indirect table only points to 32 k real entries, so uses 15 bits per entry. In an example implementation, every entry in the indirect table is more than an order of magnitude larger than the corresponding entry in the value table. Therefore, the indirect table will never be able to fill more than 50%, and a 50% full table has an approximately 40% probability of collision. If the indirect table is kept to 25% full, this reduces the probability of collision to approximately 20%.

In another embodiment, the hash table system 100 includes power saving features. In an implementation, an unused indirect table, or value table, or both, are powered down to save overall power consumption. The value table may be divided into multiple physical instances that can be powered down when the value table is only partially filled. The use of pointers in the indirect table allows grouping of entries in the value table into fewer physical memory instances.

Table Size

In an embodiment, an indirect table 106 is X times the size of the corresponding value table 104, without being unduly large. It is beneficial to use an indirect table if it can be made bigger than the value table, preferably much bigger. In an implementation, an indirect table 106 has 2× or more entries when compared to the value table.

In an embodiment, the VALUE0 value table 104 is the largest table, and the value table size decreases progressing through VALUE1, ... ,VALUE7, with VALUE7 being the smallest size. In an example embodiment, the VALUE7 value table 104 has only a dozen entries, while the HASH7 indirect table 106 can be 4 bits wide, and have 100 times the number of entries as the VALUE7 value table.

Priority Encoding

Use of priority in selection of the hash function 102 allows table sizes to be optimized based upon the probability that a value could not be added to a previous table. The lowest priority tables will be very small and therefore the cost of having a many times larger indirect table is low enabling very low probabilities of collision to be achieved on the lowest priority tables.

Priority encoding can determine which value table or indirect table to use for a given insertion. In an example embodiment, priority encoding can be configurable, but is resolved in hardware so that add operations are completed in a deterministic amount of time. In an implementation, the priority encoding determines to: spill into hash 1 only if a collision in level 0; spill into hash 2 only if collision in 1; and so on. With respect to table size, a second table only needs to be as large as the probability of collision in 1st table * size of first table, because of priority encoding. Known approaches use random picking & equal sized tables.

Free Entry List

Entries in the VALUE<3 ... 7> value tables 104 are referenced by the indirect HASH<3 ... 7> tables 106. However, since there are fewer entries in the VALUE<3 ... 7> tables 104 than in the corresponding indirect HASH<3 ... 7> table 106 at the same level, the entries in the VALUE<3 ... 7> tables 104 are allocated dynamically and only when needed.

In an embodiment, a free entry list, or free list, is used to handle the allocation. Unused entries in the VALUE<3 ... 7> tables 104 are placed on a free entry list at the same level, so that an entry at that level can easily be requested and referenced by the HASH<3 ... 7> when needed. The free entry list is used to identify available entries in the value table that may be mapped to an entry in an indirect table. In an embodiment, the mapping is stored directly in the indirect table, not in the free entry list.

The free entry list is created for each VALUE<3 ... 7>, and can be built using the VALUE<3 ... 7> entries themselves, since the VALUE<3 ... 7> entries does not carry any other information when unused and are thus on the free entry list.

The free entry list can be stored according to one or more suitable approaches, examples of which are discussed below. The value table should carry an indication if an entry is used. However, deterministic performance can not be achieved if the value table needs to be searched to find a "free" entry. Consequently, in an embodiment, a pointer is stored elsewhere to point to where a "free" entry is available; in such an embodiment, a check of the entry in the value table is only an error check ensuring that the entry is indeed "free".

As entries are removed from the value table, due to ageing of entries for example, the free space may become fragmented. In such a situation, tracking of the free entries with a single pointer may not be suitable, and an alternative approach is desirable.

In an embodiment, the free entry list comprises a long bit vector in which each bit represents a location in the value table. In an example embodiment, a logic 1 indicates a free location. In this embodiment, logic is used to find a bit that is non-zero in the bit vector, indicating which location in the value table is available.

In an embodiment in which the total number of entries in the value table becomes large (>128 for example), a second level of indexing is used. In an example embodiment, each bit within the index indicates if a space is available within a block of locations within the value table, with a different bit vector being used for each block. In an example embodiment, these bit vectors are different datawords within a RAM instance. Such an example embodiment provides a quite rapid identification of a free entry in a deterministic latency for 16K entries with only the 1 level of index in to a free indication RAM. In an embodiment, the RAM contains only 1 bit per entry in the value RAM and is therefore fairly inexpensive. In an embodiment in which even more entries are required to be indexed, then an additional level of indexing is used.

In another embodiment, the free entry list comprises a FIFO based free entry list. In an example embodiment, a background task is used to provide a list of "free" addresses to the FIFO, which are then consumed as new entries are added to the value table. This background task can be either hardware or firmware based, depending upon the depth of the FIFO and the expected add rate for the specific value table. A firmware based solution has an advantage of being the most inexpensive approach, though could experience slower performance as the table became full and fragmented. In an embodiment, the depth of the FIFO is increased to allow for more time between events where free entries are added to the FIFO. Further mitigating the possible performance challenges is the fact that the add rate for the value tables with indirect pointers will be lower than the overall add rate of the full solution, since only entries that do not collide in the higher priority hash functions will be added to these tables.

Search/Lookup

When lookup of an entry is requested, the key to the lookup is generated. The different hash functions are evaluated for the key. For hash functions 102 having an associated indirect table 106, the pointer (or index) is retrieved. Values are then read from registers in all value tables 104 for exact match comparison. If a match is found, the contents of the matching value table entry is returned as the result of the lookup, as it matches the key that is expected. If no match is found, the search resulted in a miss and the key is not present.

Add—No Collision

When insertion of an entry is requested, then data for the entry, corresponding to an entry in a value table 104, is provided. This insertion can be a result of either hardware insertion from a packet interface or software insertion requested by a host processor.

The entry includes a key value. Each of the different hash functions is evaluated for the key, providing indexes into either the value tables 104 or indirect tables 106, depending upon the hash function 102. The indexed entry indicates if that entry is free or occupied. The first hash function that contains a free entry is selected for insertion.

In the case of the indirect tables, a free location is selected from the associated value table 104 and a pointer is added to the indirect table 106. In an embodiment, the pointer is added in the specific register in the indirect table 106 indexed by the hash value for the search key. If no free location is available in the value table 104 for a given hash function 102, then the next non-occupied hash function is checked for a free entry.

If a free entry could not be found in any non-occupied hash functions, then an overrun occurred, and addition of the VALUE entry could not be completed.

Add—Collision

As the structure of the hash function is only selected to reduce the probability of collision, some insertions will result in a collision. When an overrun of all hash functions occurs, the data required for the insertion is added to a collision queue readable by firmware. In an embodiment, the collision queue is a dedicated queue used only for this purpose, to avoid head of queue blocking. In an embodiment, an interrupt from the collision queue is used to signal firmware when the queue is non-empty. Firmware can then perform a controlled removal of one of the existing entries that block insertion of the new entry. In an embodiment, the removed entry is then reinserted through a firmware add request. The hash system thereby operates as a cuckoo hash, through offline firmware control, which can also be referred to as a firmware assisted cuckoo, as firmware performs the removal and reinsertion of entries to resolve collisions. In an embodiment, the firmware is provided on a general purpose host processor that communicates with the hardware via the CPU Interface in FIG. 5.

Based upon the arrival rate of new add [CRS] requests and the average time required for firmware to perform a removal and reinsertion request, a suitable probability of collision can be determined that ensures collisions do not occur more frequently than can be serviced by the firmware. As collisions can cluster in time, a queue is used that can store a large number of detected collisions. This ensures that no collisions are discarded preventing a new entry from being added to the table due to processing delay.

Consider the following example, in which a probability of collision is $10^{-6}$, and a maximum packet rate of design is 30 million packets per second. At a maximum add rate of one add per packet, 30 collisions would occur per second in this example. This allows a minimum of 33 ms of processing time to perform a cuckoo operation. However, it has been observed that, in practical implementations, not all packets are of minimum size, with a reasonable average resulting in a packet rate of <15 Mbps. In an example embodiment, "adds" can only be performed until the table is full at 32 k entries, giving a statistical total of less than 1 collision for the population of the entire table, causing the cuckoo operation to occur very infrequently.

Overrun Risk and Handling—Types of Overrun

Insertion of a new entry can be rejected for suitable reasons, including one or more of the following examples:

1) Switch is full, since it has reached the maximum number of entries, as programmed by the CPU. This is a software controlled limitation.

2) All levels are filled for the locations selected by the hash functions. This is a limitation determined by hardware design.

3) Free location is found at hash level, but there are no free entries at that level. This is a limitation determined by hardware design.

If a hardware controlled insert was attempted, but failed due to full switch, then the CPU can obtain packet information through a FULL_LOG FIFO, or similar FIFO. If it failed due to all levels full or no free entries, then the CPU can obtain packet information through an OVERRUN_LOG FIFO, or similar FIFO.

If a software controlled insert was attempted, but failed, then the reason is indicated, such as through ASL_CPU_OPER.VALUE, which indicates rejected insert either due to switch full, or general hardware limited overrun. Details of the hardware overrun can be indicated, such as in ASL_CPU_OPER.RES_OVERRUN.

Handling of Overrun

Overrun in the hash system may occur due to either overrun in the switch or in the complete hash system. If the overrun occurred at hardware learning, then part of the packet can be placed in a storage location, such as in the ASL_OVERRUN_LOG, so the software can inspect the contents. If overrun occurred at CPU add of entry then overrun can be reported, such as in a ASL_CPU_OPER.STATUS field. In either case, then further handling of the overrun relies on software.

Software can then control movement of one of the eight entries that block insertion of the new entry. If any of the currently inserted entries can be moved, and this is very likely, then it is possible to insert the entry that caused the overrun at the position freed up by the move. The hash system thereby operates as a cuckoo hash, through the software control. Details regarding cuckoo hashing and its general implementation are known to one of ordinary skill in the art.

The application of the cuckoo hashing concept for a hash table according to an embodiment of the present disclosure will now be illustrated through an example. In this example there are only three levels, and each of the levels has only four locations. In the example, four entries are inserted, named A, B, C, and D, with four different keys, giving different hash functions. In a worst case scenario, the hash functions result in a collision when entry D is to be inserted.

The four entries have the hash values shown in Table 1 below.

TABLE 1

Example of hash value for four entries

| Level | Entry A | Entry B | Entry C | Entry D |
|---|---|---|---|---|
| 2 | 0 | 2 | 1 | 1 |
| 1 | 3 | 0 | 0 | 0 |
| 0 | 1 | 1 | 1 | 1 |

When entry A is inserted in the hash table, the result is as shown in Table 2, where the entry name without parenthesis indicates the actual inserted location of entry, and the entry name in parenthesis indicates a possible location of the entry. In Table 2, the three functions hash into different locations, and there is a bias towards Index 0.

TABLE 2

Example with entry A inserted

| Level | Index 0 | Index 1 | Index 2 | Index 3 |
|---|---|---|---|---|
| 2 | (A) | | | |
| 1 | | | | (A) |
| 0 | | A | | |

When entry B is inserted in the hash table, the result is as shown in Table 3 below.

TABLE 3

Example with entry B inserted

| Level | Index 0 | Index 1 | Index 2 | Index 3 |
|---|---|---|---|---|
| 2 | (A) | | (B) | |
| 1 | B | | | (A) |
| 0 | | A (B) | | |

When entry C is inserted the hash table, the result is as shown in Table 4 below.

TABLE 4

Example with entry C inserted

| Level | Index 0 | Index 1 | Index 2 | Index 3 |
|---|---|---|---|---|
| 2 | (A) | C | (B) | |
| 1 | B (C) | | | (A) |
| 0 | | A (BC) | | |

When entry D is to be inserted, it collides with entry A at level 0, entry B at level 1 and entry C at level 2, thus cannot be inserted without intervention. This is shown in Table 5 below.

TABLE 5

Example with entry D unable to be inserted

| Level | Index 0 | Index 1 | Index 2 | Index 3 |
|---|---|---|---|---|
| 2 | (A) | C (D) | (B) | |
| 1 | B (CD) | | | (A) |
| 0 | | A (BCD) | | |

This overrun at entry D is resolved with the cuckoo hash algorithm, where entry A is moved from index 1 at level 0 to an alternative placing of entry A at index 3 at level 1. The updated table with moved entry A is shown in Table 6 below.

TABLE 6

Example with entry A moved to alternative location

| Level | Index 0 | Index 1 | Index 2 | Index 3 |
|---|---|---|---|---|
| 2 | (A) | C (D) | (B) | |
| 1 | B (CD) | | | A |
| 0 | | (ABCD) | | |

It is then possible to insert entry D at index 1 of level 0, which is shown in shown in Table 7 below.

TABLE 7

Example with entry D moved inserted

| Level | Index 0 | Index 1 | Index 2 | Index 3 |
|---|---|---|---|---|
| 2 | (A) | C (D) | (B) | |
| 1 | B (CD) | | | A |
| 0 | | D (ABC) | | |

It is thereby possible to fit the four entries, by moving entries after the initial insertion. In an implementation using priority encoding, the tables get increasingly smaller from Level 2 down to Level 0, and the system can make a smart decision by pushing out the one on the bottom.

An example method of cuckoo hash table update for the hash table [ASL] is shown and described below.

1) Disable ageing background process through ASL_CTRL_STAT.AGING_BKG_RUN. This is to ensure that entries are not being removed by hardware while software accesses the entries through register reads. In an embodiment, the register reads are either direct or indirect.

2) Create the result value for the entry to be inserted, and write this in registers with arguments for CPU operations.

3) Perform a CPU AddUpd operation, to determine index values in hash tables for the entry to learn. If operation was successful, then the entry has been learned by hardware after insertion in FIFO. This learn algorithm can be terminated after re-enabling background ageing.

4) The CPU AddUpd operation was unsuccessful, and software has to make room for the entry to learn. Software chooses the entry in one of the hash levels, in order to redistribute that entry. The result value of the entry to redistribute is written as argument to the CPU operation, with operation at the current hash level disabled. Copying the entry will include the ageing information, so that the moved entry will have the same ageing. A CPU AddUpd operation is then performed.

If the CPU AddUpd operation was unsuccessful, then software can either try to move another entry of those blocking learning of the first entry, or try to move one of the entries that blocks moving of the current entry.

When finally the CPU AddUpd is successful, then the entry to redistribute has been duplicated. The first instance of the entry is then removed with a CPU Remove operation, with operation being only enabled at hash level for the first entry.

5) Try to learn the first entry again using a CPU AddUpd operation. If the operation was unsuccessful, the reason is that hardware has just learned an entry on the position that software freed up. Software must then move another entry, as described above, and retry the CPU AddUpd learn until it is successful.

6) Once the first entry has been learned with software support, then re-enable ageing background process through ASL_CTRL_STAT.AGING_BKG_RUN.

Risk of Overrun

In an embodiment, the hash lookup system in the search table is designed such that risk of overrun is below about $10^{-6}$ when the complete set of entries are inserted. An example of the risk of overrun at inserting of different number of entries is shown in Table 8 below.

TABLE 8

| Risk of overrun when inserting | |
|---|---|
| Filling | Risk of overrun |
| 32 k | $840 * 10^{-9}$ |
| 31 k | $96 * 10^{-9}$ |
| 30 k | $8.9 * 10^{-9}$ |
| 28 k | $0.04 * 10^{-9}$ |
| 26 k | $<<0.001 * 10^{-9}$ |

These values in Table 8 are generated based on a statistical model using a Poisson distribution. The assumption for use of this distribution is an equal probability for use of each location in the eight-way hash tables. This equal probability is obtained by use of hash functions that are orthogonal to each other and each have uniform distributions.

With the selected parameters, the risk is less than $10^{-6}$ for filling 32 K entries. When cuckoo hashing is applied by firmware, the overall risk of overrun is substantially 0 for all practical datasets.

Calculating the risk of overrun for each hash table, and summarizing this risk over all the eight hash tables in the eight-way hash table system, gives the overall risk of overrun.

The risk calculation is based on the assumption that the key of the inserted entries is not selected in a way that deliberately is targeted at creating collisions between entries.

It is not trivial to find a set of keys that make the tables collide, since it requires collision for the same key at multiple levels using different hash functions. A brute force search may require evaluation of an exorbitant number of keys. However, if the hash functions are known, a set of keys may be found using analytical methods.

Removal

Removal of an entry can be requested either by hardware due to ageing or flushing, or by software due to host processor or CPU operation.

Removal of an entry is based on the key of that entry. The removal is handled by first making a lookup, in order to determine value table index, including an index for an indirect table 106, if present. The matching entry in the value table is marked as unused, together with any entry in indirect table. If the lookup results in a miss, then nothing further is done for removal, but the miss is indicated to software.

Ageing

Entry ageing is a common requirement in networking applications to ensure that stale data does not continue to occupy locations within the value tables. The search table supports ageing of entries with a background task in hardware with entry removal when age limit is reached.

The entry age value is located in the value table with the entry. When an entry is added, the age is set to new. Over time, the background process traverses all locations in the indirect tables and value tables incrementing the age value for an entry in the value table. When the background process encounters an entry where the age limit is reached, the background process may remove the entry.

When a search of a key results in a match, the age associated with the entry is reset. This mechanism ensures that active entries remain in the table but inactive or stale entries are removed over time, making room for new entries.

Flushing

Flushing of a search table is a common requirement in networking applications. For example, a protection event caused by an Ethernet ring line impairment would require an Ethernet bridging table to be flushed and new ports learned for destination addresses. Flushing of the search table can be achieved by stepping through the indirect pointer tables one entry at a time. The address retrieved from the indirect table is then used to read an entry from the value table to determine if it should be flushed. If it is flushed or removed, both the entry in the value table and the indirect table may then be removed. In the case of hash tables that do not have an indirect table, the value table is instead stepped through.

Figure 3:
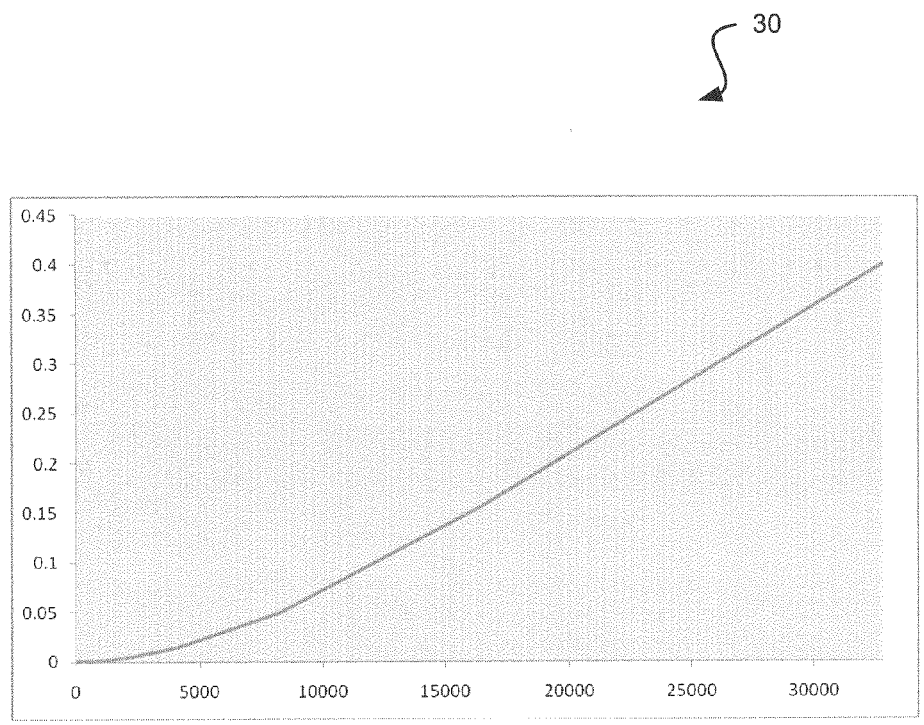
Figure 5:
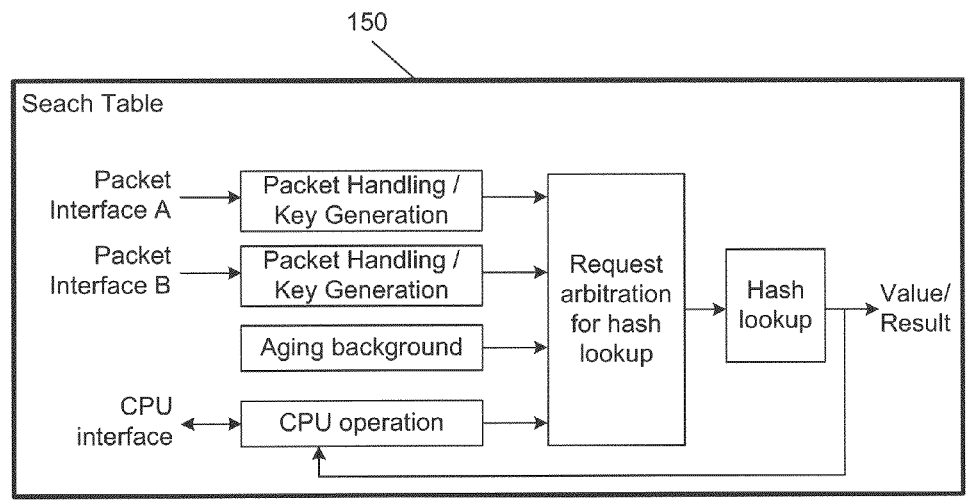
FIG. 5 is a block diagram of an efficient search table incorporating a hash table system according to an embodiment of the present disclosure.

FIG. 5 is a block diagram of an efficient search table 150 according to an embodiment of the present disclosure. In an embodiment, the efficient search table 150 includes a hash table system 100 including one or more indirect tables 106 as described previously in relation to FIG. 3.

Figure 6:
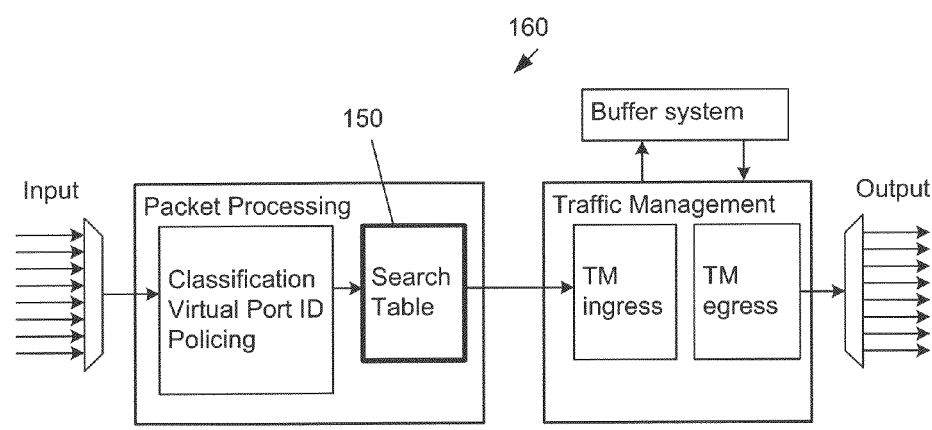
FIG. 6 is a block diagram of a packet networking device incorporating an efficient search table according to an embodiment of the present disclosure.

FIG. 6 is a block diagram of a packet networking device 160 incorporating an efficient search table 150 according to an embodiment of the present disclosure. The efficient search table 150 and its search function can be combined with other functionality in the packet networking device 160. The search table 150 is used to make forwarding decisions between virtual ports as identified by the classification engine. These forwarding decisions may be made based upon MPLS labels, Ethernet MAC addresses or IP addresses depending upon the protocols in operation in the packet network.

Commercial Significance of Embodiments

The efficient search table of embodiments of the present disclosure enables exact matching of arbitrary datasets with high throughput and low latency. In high packet rate networking applications high search rates and low latency are critical to quality of service. Existing solutions based upon hash functions suffer from collisions and their resulting non-deterministic performance. Other common solutions based upon tries or other tree type structures suffer from high latency.

This disclosure provides background on hash functions and their use in exact matching. The deficiencies of hash tables when implemented in hardware based networking devices are described along with a disclosure that resolves these deficiencies.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A networking device comprising:
   a memory storing a search table, the search table including:
   a first value table comprising first addressable locations for storing data;
   a first indirect table comprising second addressable locations, each second addressable location storing a pointer that maps to one of the first addressable locations; and
   a hash function for generating an address of one of the second addressable locations of the first indirect table based on a search key;
   wherein a total number of second addressable locations in the first indirect table is greater than a total number of first addressable locations in the first value table.

2. The networking device of claim 1, wherein the search table further includes:
   a second value table comprising third addressable locations for storing data;
   a second indirect table comprising fourth addressable locations, each fourth addressable location storing a pointer to one of the third addressable locations; and
   a second hash function for generating an address of one of the third addressable locations of the second indirect table based on the search key;
   wherein a total number of fourth addressable locations in the second indirect table is greater than a total number of third addressable locations in the second value table.

3. The networking device of claim 2 further comprising, a first free entry list configured to identify first addressable locations in the first value table that are available to store data and a second free entry list configured to identify third addressable locations in the second value table that are available to store data.

4. The networking device of claim 2, further comprising a single free entry list configured to identify first addressable locations in the first value table that are available to store data and to identify third addressable locations in the second value table that are available to store data.

5. The networking device of claim 4, wherein the free entry list comprises more than one level of indexing, wherein the free entry list is configured to identify a first block of first addressable locations in the first value table that are available to store data and a second block of third addressable locations in the second value table that are available to store data.

6. The networking device of claim 5, wherein a different bit vector is used to identify the first block of first addressable locations and the second block of third addressable locations, and wherein each bit vector is a different dataword within a random access memory (RAM).

7. The networking device of claim 2, wherein the first value table is a higher level value table and the second value table is a lower level value table, wherein the lower level value table has a smaller table size than the higher level value table.

8. The networking device of claim 7, wherein the first value table comprises an initial value table and the second value table comprises a subsequent value table, the subsequent value table having a decreasing table size when compared to the initial value table.

9. The networking device of claim 8 wherein the subsequent value table contains the overflow of the initial value table, and the size of the subsequent value table is about 60% of size of the initial value table.

10. The networking device of claim 1, further comprising a free entry list configured to identify first addressable locations in the first value table that are available to store data.

11. The networking device of claim 10, wherein the free entry list comprises a long bit vector in which each bit represents one of the first addressable locations that are available to store data.

12. The networking device of claim 10, wherein the free entry list comprises a first-in-first-out (FIFO) based free entry list.

13. A data networking system comprising:
    a memory storing a first value table comprising first addressable locations for storing data and a first indirect table comprising second addressable locations, each second addressable location storing a pointer that maps to one of the first addressable locations, wherein a total number of second addressable locations in the first indirect table is greater than a total number of first addressable locations in the first value table;
    a hash engine for receiving a hash function and for generating an address of one of the second addressable locations of the first indirect table based on a search key; and
    a non-transitory machine readable medium having stored thereon statements and instructions for execution by a processor to perform cuckoo operations for collision handling, the non-transitory machine readable medium being in communication with the memory and the processor.

14. The data networking system of claim 13 wherein the non-transitory machine readable medium comprises firmware configured to perform the cuckoo operations.

15. The data networking system of claim 14, further comprising:
    a search table comprising a processing unit interface; and
    wherein the processor comprises a general purpose processor, the search table further comprising the hash function, the first value table, and the first indirect table, and the general purpose processor comprising the firmware and being in communication with the memory via the processing unit interface of the search table.

16. The data networking system of claim 14, wherein collision detection by the firmware for initiation of the cuckoo operations is performed by the search key being sent into a collision queue.

17. The data networking system of claim 16 wherein the collision queue enables offline processing of collisions for reinsertion such that multiple collisions are queued while reinsertion is pending.

18. The data networking system of claim 17 wherein, while a nominal collision rate provides for sufficient processing time, the collision queue ensures that collisions clustering in time will not be ignored.

19. The data networking system of claim 13 wherein the memory stores a second value table comprising third addressable locations for storing data and stores a second indirect table comprising fourth addressable locations, each fourth addressable location storing a pointer to one of the third addressable locations, wherein a total number of fourth addressable locations in the second indirect table is greater than a total number of third addressable locations in the second value table, and wherein the data networking system further comprising a second hash engine for receiving a second hash function and for generating an address of one of the third addressable locations of the second indirect table based on the search key.

* * * * *